US008214521B2

(12) United States Patent
Takagi et al.

(10) Patent No.: US 8,214,521 B2
(45) Date of Patent: Jul. 3, 2012

(54) SYSTEMS AND METHODS FOR CHANGING COMPUTATIONAL TASKS ON COMPUTATION NODES TO MINIMIZE PROCESSING TIME VARIATION

(75) Inventors: Masamichi Takagi, Cupertino, CA (US); Yoshiki Seo, Cupertino, CA (US); Akio Yamada, Cupertino, CA (US); Takeo Hosomi, Cupertino, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 346 days.

(21) Appl. No.: 12/629,048

(22) Filed: Dec. 2, 2009

(65) Prior Publication Data

US 2011/0131578 A1 Jun. 2, 2011

(51) Int. Cl.
*G06F 15/16* (2006.01)
*G06F 9/46* (2006.01)
(52) U.S. Cl. .................................. 709/235; 718/105
(58) Field of Classification Search .................. 709/201, 709/235; 718/100, 105
See application file for complete search history.

(56) References Cited

U.S. PATENT DOCUMENTS

| 7,203,944 | B1 | 4/2007 | van Rietschote et al. | |
|---|---|---|---|---|
| 7,979,578 | B2 * | 7/2011 | Lakshmanan et al. | 709/238 |
| 2009/0125635 | A1 * | 5/2009 | Barga et al. | 709/231 |
| 2009/0216694 | A1 * | 8/2009 | Lang et al. | 706/12 |
| 2009/0254916 | A1 * | 10/2009 | Bose et al. | 718/104 |
| 2009/0259769 | A1 * | 10/2009 | Lakshmanan et al. | 709/241 |
| 2009/0300615 | A1 * | 12/2009 | Andrade et al. | 718/100 |
| 2009/0313400 | A1 * | 12/2009 | Amini et al. | 710/29 |
| 2009/0319687 | A1 * | 12/2009 | Goldstein et al. | 709/241 |
| 2010/0030896 | A1 * | 2/2010 | Chandramouli et al. | 709/224 |

OTHER PUBLICATIONS

Pietzuch et al., Network-Aware Operator Placement for Stream-Processing Systems, 2006 http://citeseerx.ist.psu.edu/viewdoc/summary?doi=10.1.1.130.6274.*
Hans F. van Rietschote et al., Migrating virtual machines among computer systems to balance load caused by virtual machines, Patent No. US , Date of Patent: Apr. 10, 2007.
Michael Nelson, Beng-Hong Lim, and Greg Hutchins, Fast Transparent Migration for Virtual Machines, USENIX'05, 2005.
Christopher Clark, Keir Fraser, Steven Hand, Jacob Gorm Hansen†, Eric Jul†, Christian Limpach, Ian Pratt, Andrew Warfield, Live Migration of Virtual Machines, In Proc. 2nd conference on Symposium on Networked Systems Design & Implementation, 2005.
M. Cherniack et al, Scalable Distributed Stream Processing, In Proc. CIDR'03, 2003.
Ron Avnur et al, Eddies: Continuously Adaptive Query Processing, Proc. ACM SIGMOD Int'l Conf. Management of Data, 2000.

* cited by examiner

*Primary Examiner* — Joseph Avellino
*Assistant Examiner* — James Conaway
(74) *Attorney, Agent, or Firm* — Bao Tran; Joseph Kolodka

(57) ABSTRACT

Systems and methods are disclosed to process streaming data units (tuples) for an application using a plurality of processing units, the application have a predetermined processing time requirement, by changing an operator-set applied to the tuple by a processing unit, on a tuple-by-tuple basis; estimating code requirement for potential operators based on processing unit capability; and assigning the potential operators to the processing units.

20 Claims, 11 Drawing Sheets

SYSTEMS AND METHODS FOR CHANGING COMPUTATIONAL TASKS ON COMPUTATION NODES TO MINIMIZE PROCESSING TIME VARIATION

BACKGROUND

The present invention relates to processing of data units (tuples) for an application using a plurality of processing units.

As embedded computing grows ubiquitous, each embedded object gains the capacity for processing and communicating streams of data. The architecture of current database management systems assumes a pull-based model of data access: when a user (the active party) wants data, she submits a query to the system (the passive party) and an answer is returned. In contrast, in stream-based applications data is pushed to a system that must evaluate queries in response to detected events. Query answers are then pushed to a waiting user or application.

Many stream-based applications are naturally distributed. Applications are often embedded in an environment with numerous connected computing devices with heterogeneous capabilities. As data travels from its point of origin (e.g., sensors) downstream to applications, it passes through many computing devices, each of which is a potential target of computation. Thus, distributed computation is the norm. Emerging applications are appearing in which data, generated in some external environment, is pushed asynchronously to servers that process this information. Some example applications include sensor networks, location-tracking services, fabrication line management, and network management. These applications are characterized by the need to process high-volume data streams in a timely and responsive fashion. A unit of data with streaming or continuous nature is called a "tuple". Examples of tuples include sensor data such as temperature, stock tick and media data such as audio slice and video slice. A unit of processing of tuple is called an "operator". Examples of an operator include arithmetic calculation, relational join-operations, among others.

The computer system for the application typically includes processing units and network channels that connect the processing units to form a network where the operators for the application are allocated across the processing units. The tuples arrive at the processing unit in continuous manner, and the processing unit performs assigned operators to the data items. The processing time should not vary to fulfill application requirement. For example, the processing time should be within the specified time budget. However, the processing time of the processing units can change for various reasons. For example, the processing time changes when the resource availability of the processing units, the contents of the tuples change or the tuple arrival rate changes. Thus, the selection of which processing units perform which operators, and to which tuples they apply the operators, needs to be done carefully to fulfill the application requirement.

One solution to the processing unit selection involves moving a virtual machine containing a set of operators to another processing unit with fewer loads. A set of operators for a tuple is performed by multiple virtual machines over multiple computers (processing units). One virtual machine containing operators can migrate to another processing unit when the load of the current processing unit is high. In this way, the technique can balance the loads among processing units. However, the technique cannot change the tuples on which a processing unit applies an operator. Therefore, the balancing is coarse-grained and the response-time of balancing is large because often the operation is stopped while moving operators. Thus, significant overhead can be incurred when balancing loads.

Another solution allows a run-time scheduler to move an operator to another processing unit with fewer loads. A set of operators for a tuple is performed by multiple processing units. A central scheduler allocates operators to the processing units and it can move an operator to a different processing unit at run-time to balance the loads among processing units. However, this approach also cannot change the tuples on which a processing unit applies an operator. Therefore, the balancing is coarse-grained and the response-time of balancing is large because often the processing should be stopped while moving operators. Their technique does not prepare before processing the codes for the operators to be moved to a processing unit so their technique incurs a large overhead when balancing loads. The technique also cannot move an operator which causes the change of the applying order of operators.

In yet another solution, a central scheduler routes a tuple to the processing units responsive for specific operator at run-time. Multiple processing units operate on a set of operators for a tuple. Each processing unit is assigned an operator, and the central scheduler routes a tuple to those processing units. The order of applying operators to a tuple is decided at run-time. The technique can balance the loads among processing units by changing the order and the rate of putting tuples into processing units. However, this approach cannot change which processing unit performs an operator, so it cannot balance loads between processing units.

SUMMARY

Systems and methods are disclosed to process streaming data units (tuples) for an application using a plurality of processing units, the application have a predetermined processing time requirement, by changing an operator-set applied to the tuple by a processing unit, on a tuple-by-tuple basis; estimating code requirement for potential operators based on processing unit capability; and assigning the potential operators to the processing units.

For the application program, operators are performed on tuples. The processing is performed by a set of processing units that are connected by interconnection network. The network applies operators to tuples in a pipe-lined manner. The system inspects if a processing unit can perform the processing of all the operators assigned to it so that the processing time falls within the processing time requirement. If not, the system decides which operator-sub-set and tuple-sub-set of it will be moved to other processing units to meet the time requirement. The moving of operator-sub-set means reassigning the operators to be performed by other processing unit(s).

The moving of tuple-sub-set involves decreasing the fraction of tuples to apply an operator to on a processing unit and increasing it on another processing unit. For example, assume the system has processing units A and B. If a normalize operator is originally applied to 50% of tuples on A and 50% of tuples on B. However, due to load changes, the system can move the tuple-sub-set and changes the percentage to 40% on A and 60% on B. In this way, the system can dynamically change the processing time for each processing unit as needed to meet the processing time requirement.

Advantages of the preferred embodiment may include one or more of the following. The system decides which operator-sub-set and tuple-sub-set assigned to a particular processing unit to be moved to other processing units for handling. Moving operator-sub-set involves assigning the operator sub-set to be performed by another processing unit. Moving tuple-sub-set involves decreasing the fraction of tuples to apply an operator to from the currently assigned processing unit and increasing the tuple fraction assignment to another processing unit. Therefore, the balancing is fine-grained and the response-time of balancing is small. The system can estimate before processing the code for the operators to be performed in a processing unit and can load the code to the processing unit. Therefore, it can eliminate overhead on balancing loads. The system can move an operator which causes the change of the applying order of the operators.

DESCRIPTION

Figure 1:
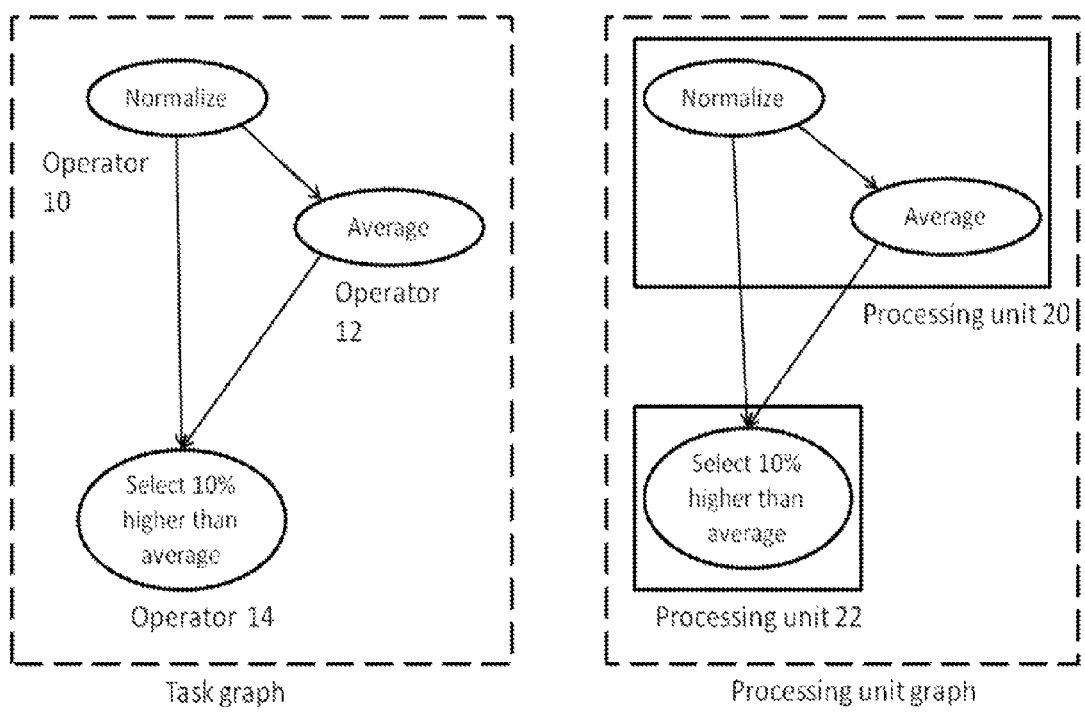
FIG. 1 shows an exemplary relationship for operators in a task graph and a processing unit graph.

FIG. 1 shows an exemplary relationship for operators in a task graph and a processing unit graph. A task graph represents the application order of operators and data flow of operators. A sub-graph of the task graph is mapped to a processing unit and the operators are applied to tuples by the processing unit. A processing unit graph represents the network of processing units after the mapping.

An operator performs calculation to be applied to tuples. In the example of FIG. 1 for handling stock ticks, operator 10 perform normalization of stock value to historical highest value, operator 12 calculates the average over a specified period of time and operator 14 selects ticks that are higher than the average.

In FIG. 1, the task graph indicates that an application needs operator 10 performs a normalize operation, while operator 12 computes an average value and operator 14 selects items that are 10% higher than the average value. The task graph is mapped to a processing unit graph that includes two processing units 20 and 22. The system assigns processing unit 20 to run operators 10 and 12 to perform normalization and average value computation, respectively. The system assigns processing unit 22 to perform operator 14 to select items greater than 10% of the average value in this example.

For the above exemplary application program, operators are performed on data tuples. The processing is performed by a set of processing units 20 and 22 that are connected by interconnection network. The network applies operators 10-14 to tuples in a pipe-lined manner. The system of FIG. 1 inspects if a processing unit can perform the processing of all the operators assigned to it so that the processing time falls within the processing time requirement. If not, the system decides which operator-sub-set and tuple-sub-set should be moved to other processing units to meet the requirement. Moving operator-sub-set means assigning the operator sub-sets to be performed by other processing unit.

Moving tuple-sub-set involves decreasing the fraction of tuples to apply an operator to on a processing unit and increasing it on another processing unit. For example, assume the system has processing units A and B. If a normalize operator is originally applied to 50% of tuples on A and 50% of tuples on B. However, due to load changes, the system can move the tuple-sub-set and changes the percentage to 40% on A and 60% on B. In this way, the system can dynamically change the processing time for each processing unit as needed to meet the processing time requirement.

The system decides which operator-sub-set and tuple-sub-set assigned to a particular processing unit to be moved to other processing units for handling. Moving operator-sub-set involves assigning the operator sub-set to be performed by another processing unit. Moving tuple-sub-set involves decreasing the fraction of tuples to apply an operator to from the currently assigned processing unit and increasing the tuple fraction assignment to another processing unit. Therefore, the balancing is fine-grained and the response-time of balancing is small.

The system can estimate before processing the code for the operators to be performed in a processing unit and can load the code to the processing unit. Therefore, it can eliminate overhead on balancing loads. The system can also move an operator which causes the change of the applying order of the operators.

Figure 2:
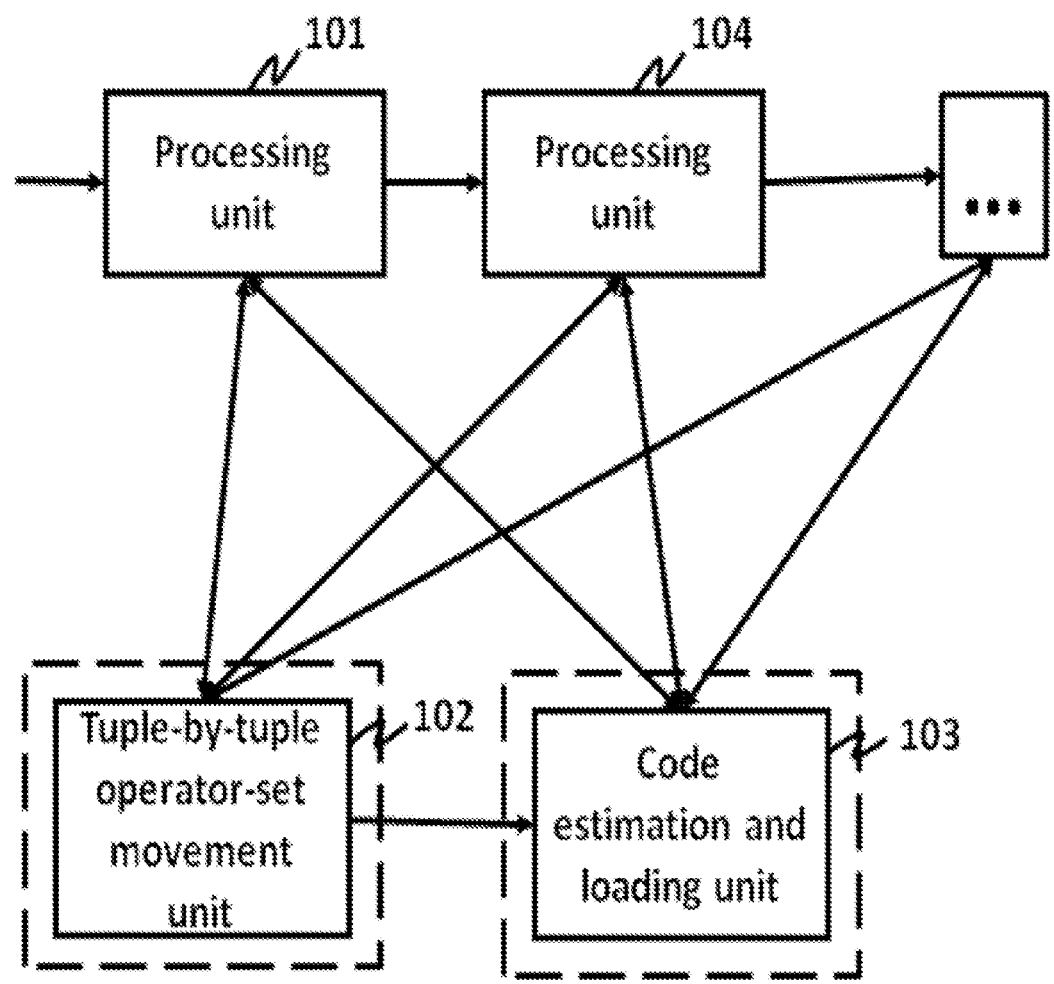
FIG. 2 shows an exemplary logical block diagram of a stream processing system.

FIG. 2 shows an exemplary logical block diagram of a stream processing system. This system includes processing units 101 and 104. Each processing unit 101 or 104 inputs tuples, and performs operator processing onto tuples, and outputs tuples to another processing unit. The connection between processing units are determined and set-up before processing by a central controller (not shown).

The system of FIG. 2 also includes tuple-by-tuple operator-set movement unit 102. The unit 102 inspects whether the processing time for the assigned operators of processing unit will be within the specified requirement. If not, the block decides which operator-sub-set and its tuple-sub-set will be moved to other processing units to meet the requirement. The system also includes code estimation and loading unit 103 that estimates which operators might be performed on processing units, and directs the processing units to load the codes for the estimated operators.

Figure 3:
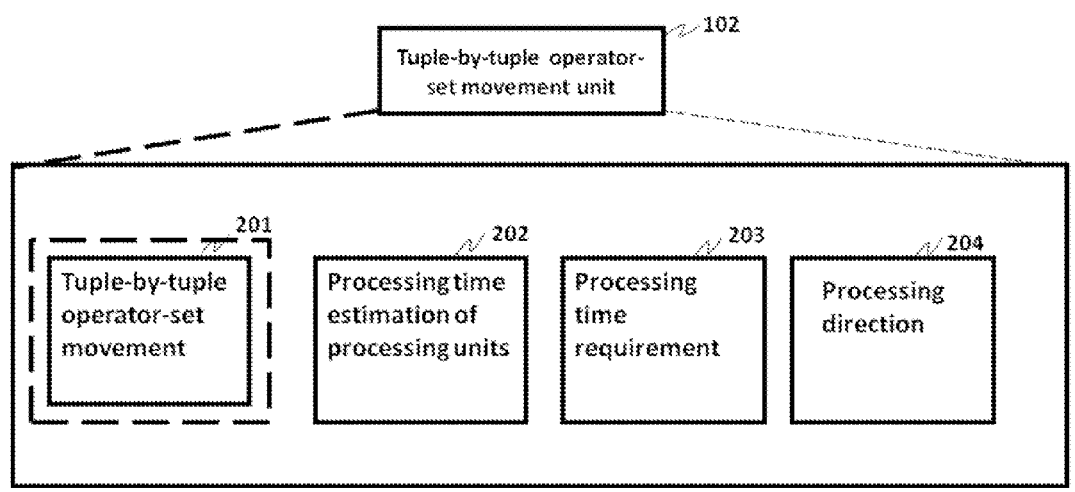
FIG. 3 shows an exemplary component diagram of a tuple-by-tuple operator-set movement unit.

FIG. 3 shows an exemplary component diagram of tuple-by-tuple operator-set movement unit 102. In FIG. 3, tuple-by-tuple operator-set movement unit 201 inspects and determines which processing unit will be able to perform assigned operators for a particular application within the application's processing time requirement. Block 201 then moves a time-gap back and forth among processing units by moving operator assignments back and forth among processing units. Unit 201 also inspects which processing unit will be unable to perform assigned operators within the requirement. Unit 201 then moves operator-sub-set and tuple-sub-set to other processing units so that the processing times of the processing unit will meet the requirement. Block 201 moves the tuple-sub-set to decrease the fraction of tuples to apply an operator to from a processing unit and increases the tuple fraction on the other processing unit.

Block 202 performs processing time estimation of processing units. Block 202 estimates the processing time for the current node to apply assigned operators. This can be performed by measuring the actual processing time or alternatively can also be performed by an analytical model that utilizes current tuple input rate and operator type and capability of the processing unit.

Block 203 handles processing time requirements and stores the processing time requirement for processing units. Block 204 provides processing direction and directs processing units on which operators must be performed on a tuple. Block 204 utilizes information from tuple-by-tuple operator-set movement unit 201. The direction can be implemented by communicating through interconnection network with processing units.

Figure 4:
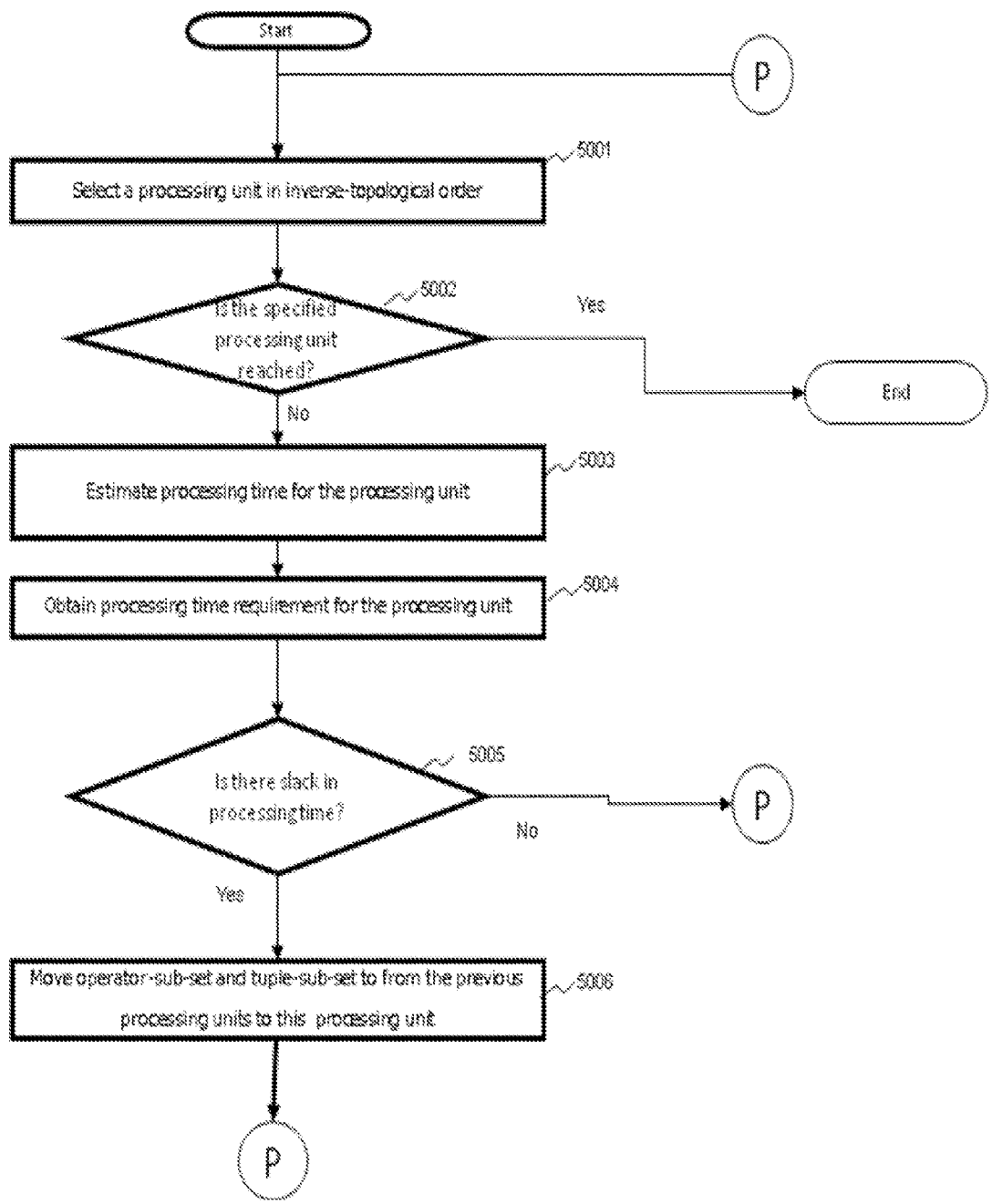
FIG. 4 shows an exemplary process for moving processing time slacks among processing units for moving operator-set and tuple-set.

FIG. 4 shows an exemplary process for moving processing time slacks among processing units for moving operator-set and tuple-set. First, a sub-graph of the processing unit graph is chosen as an input. The sub-graph can be the whole processing unit graph following the processing unit specified by the caller or critical-path with regard to processing time following the processing unit specified by the caller. This operation selects a processing unit using the inverse-topological order of the sub-graph (5001).

If the process reaches the specified processing unit, then the process terminates. If not, the process proceeds to 5003 (5002). The process calculates the difference between the original operator and tuple assignment to processing units and the modified one and the difference is the output.

Next, the process estimates the processing time of the processing unit (5003). The system then obtains the processing time requirement for the processing unit (5004). In 5005, the system checks the processing time. If the estimated processing time is within the processing requirement, the algorithm proceeds to 5006. If not, the algorithm returns to 5001.

The gap between the estimated processing time and the requirement is called slack. Operation 5006 moves the operator-sub-set and tuple-sub-set from the processing units preceding in the sub-graph to fill the sub-set of the slack. The size of sub-set to move can be determined according to the required slack amount specified by the caller. The application order restriction of operators is considered when moving the operator-sub-set. For example, if the preceding processing unit has two operators A and B, and there is an order restriction where A and B should be applied in this order, either of the following cases is allowed: (1) only B is moved or (2) both A and B are moved. The examples for movement are following: (1) An average operator is moved from the preceding processing unit to the current processing unit, (2) an average operation for 50% of tuples is moved and (3) a keyword-match operation for the first 100 tuples is moved. After that, the process of FIG. 4 proceeds to 5001.

Figure 5A:
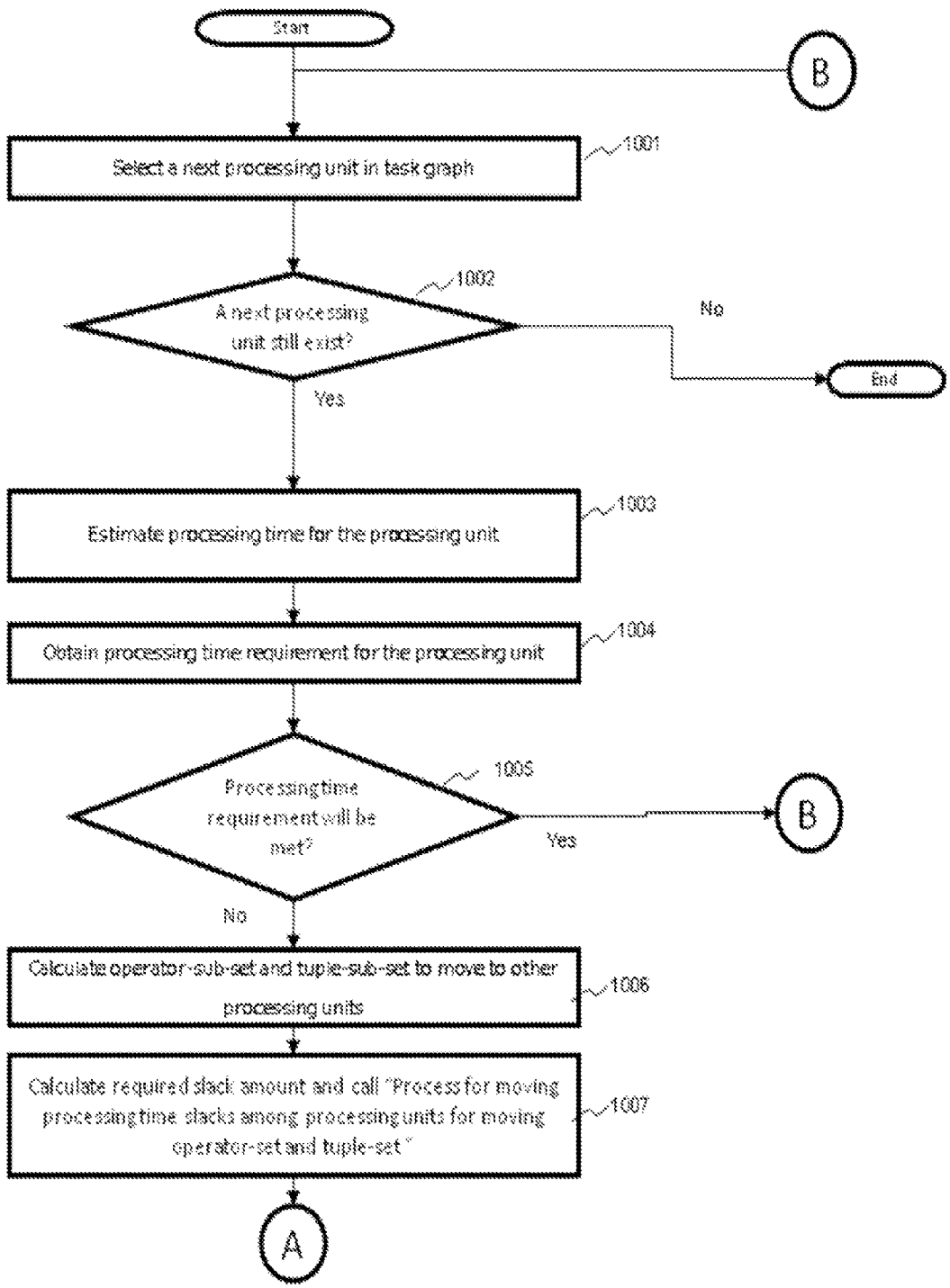
FIGS. 5A and 5B show an exemplary process for moving operator-set and tuple-set to other processing units.
Figure 5B:
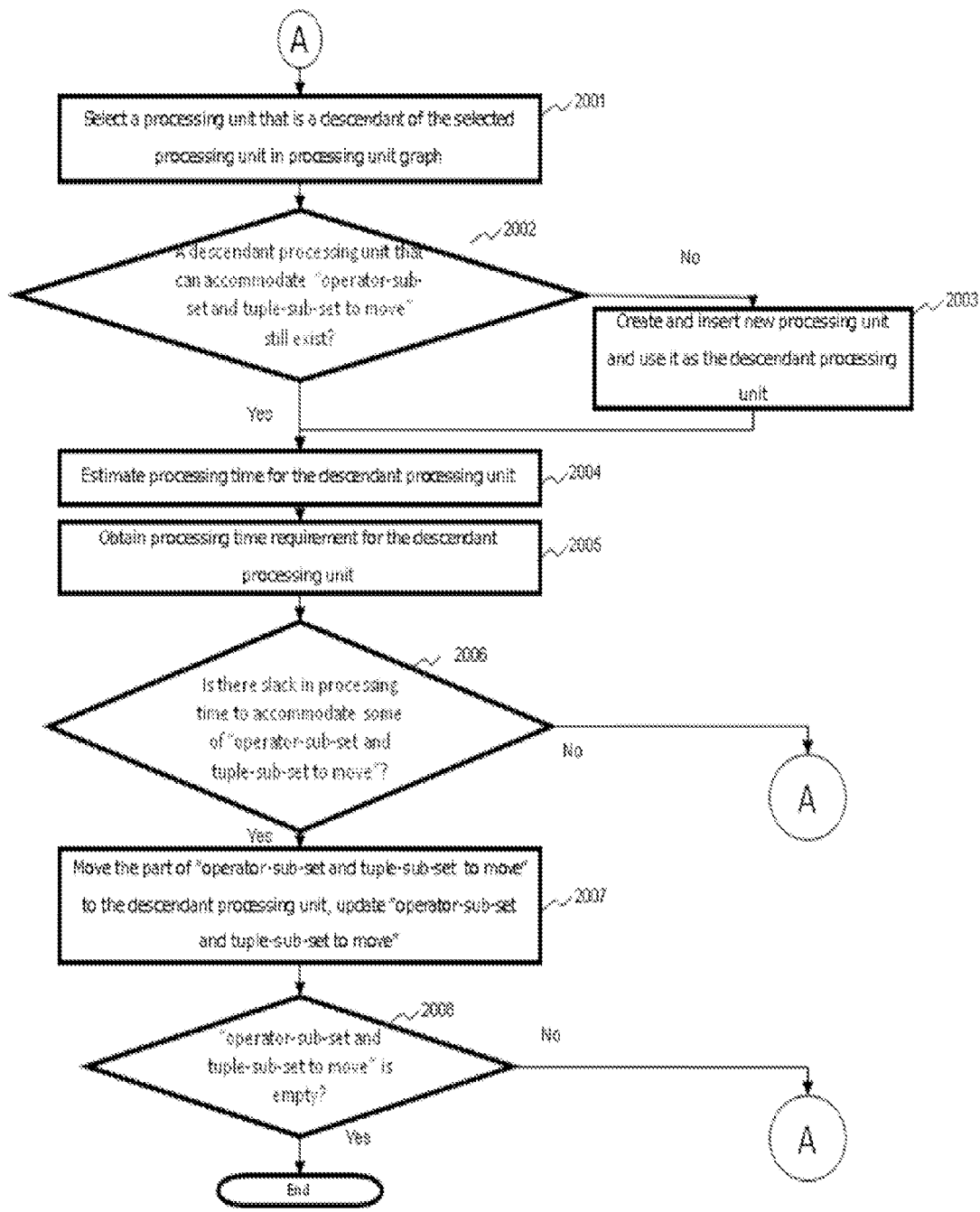

FIGS. 5A and 5B show an exemplary process for moving operator-set and tuple-set to other processing units. The processing unit graph is the input to the process in 1001. In one embodiment, the operation selects a processing unit using the topological order or inverse topological order of the processing unit graph. In 1002, if there is a processing unit that is not selected, the algorithm proceeds to step 1003. If not, the algorithm terminates. In 1003, the process estimates the processing time of the processing unit.

In 1004 the process obtains processing time requirement for the processing unit. In 1005 If estimated processing time is within the requirement, the process returns to step 1001. If not, the process proceeds to step 1006.

In 1006 the process calculates the operator-sub-set and tuple-sub-set to move to processing units following the processing unit so that the processing time requirement will be met. The application order restriction of operators is considered when moving the operator-sub-set. For example, if the processing unit has two operators A and B, and there is an order restriction where A and B should be applied in this order, either of the following cases is allowed: (1) only B is moved or (2) both A and B are moved. The examples of movement include the following: (1) An average operator is moved, (2) an average operation for 50% of tuples is moved, or (3) A keyword-match operation for the first 100 tuples is moved.

In 1007 the process calculates the required slack amount by estimating processing time when "the operator-sub-set and tuple-sub-set to move" is performed on a processing unit following the current processing unit in the processing unit graph. The process calls "Process for moving processing time slacks among processing units for moving operator-set and tuple-set" sub-routine with the current processing unit, and the required slack amount as the inputs.

Continuing with FIG. 5B, in 2001, the process selects a processing unit that is a descendant of the selected processing unit in the processing unit graph. In 2002, if there is a descendant processing unit that is not selected and if moving "the operator-sub-set and tuple-sub-set to move" on to the descendant processing unit does not violate the operator application order specified by the application, the process proceeds to 2004, otherwise 2003. In 2003, a new processing unit is created and is inserted into the processing unit graph to make it a descendant of the selected processing unit. The process uses the processing unit as the descendant processing unit in the remainder of the process.

In 2004, the process estimates the processing time of the descendant processing unit. In 2005, the process obtains processing time requirement for the descendant processing unit. A gap between the estimated processing time and the requirement is called slack. In 2006, If a slack exists, the process proceeds to 2007, otherwise 2001. In 2007, the process moves a sub-set of "the operator-set and tuple-set to move" to the descendant processing unit, and update "the operator-set and tuple-set to move". In 2008, if "operator-set and tuple-set to move" unit is empty, the process terminates, otherwise the process returns to step 2001. When the process terminates, it calculates the difference between the original operator and tuple assignment to processing units and the modified one, and the difference is the output.

Figure 6A:
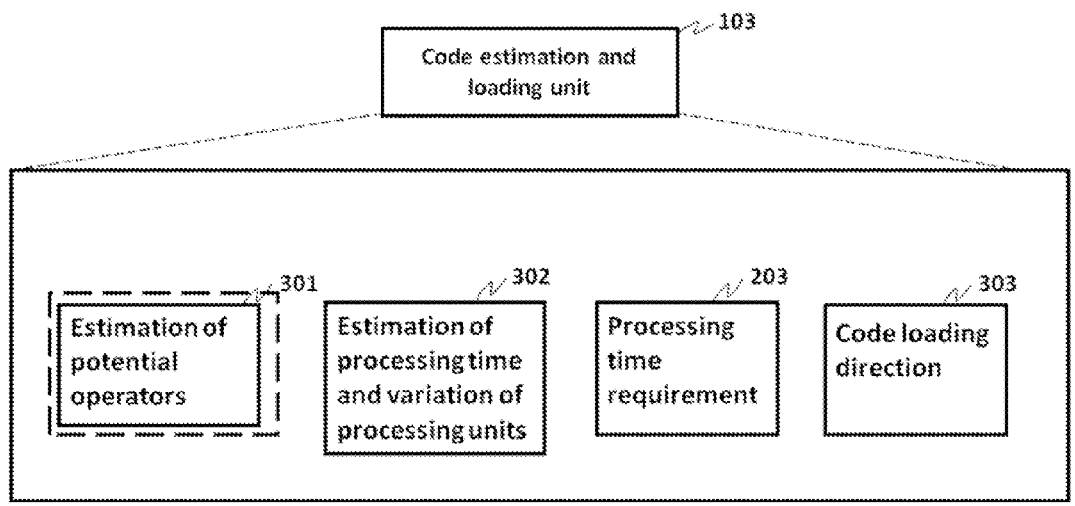
FIG. 6A shows an exemplary component diagram of a code estimation and loading unit.

Turning now to FIG. 6A, an exemplary component diagram of a code estimation and loading unit is shown. Block 301 performs estimation of potential operators. Operator assignment to processing units is given by an allocator. Block 301 inspects and determines which processing unit will not be able to perform assigned operator application within the processing time requirement. Block 301 then moves operator-set and tuple-set to other processing units so that the processing time of the processing unit will meet the requirement. In that way, block 301 estimates which operators might be processed on processing units.

Block 302 performs estimation of processing time and variation of processing units. This operation estimates a worst-case processing time of the processing unit by utilizing its processing time variation. Examples of the sources of the variation are following: change in tuple input rate, change in the contents of tuples and change in available computing resources. The variation can be given by measuring the actual variation in the past execution.

Block 203 handles processing time requirements and stores the processing time requirement for processing units. Block 303 performs code loading direction. Block 303 directs processing units to which codes must be loaded to the processing units utilizing the information of the "estimation of potential operators" block. The direction can be implemented by communicating through interconnection network with processing units.

Figure 6B:
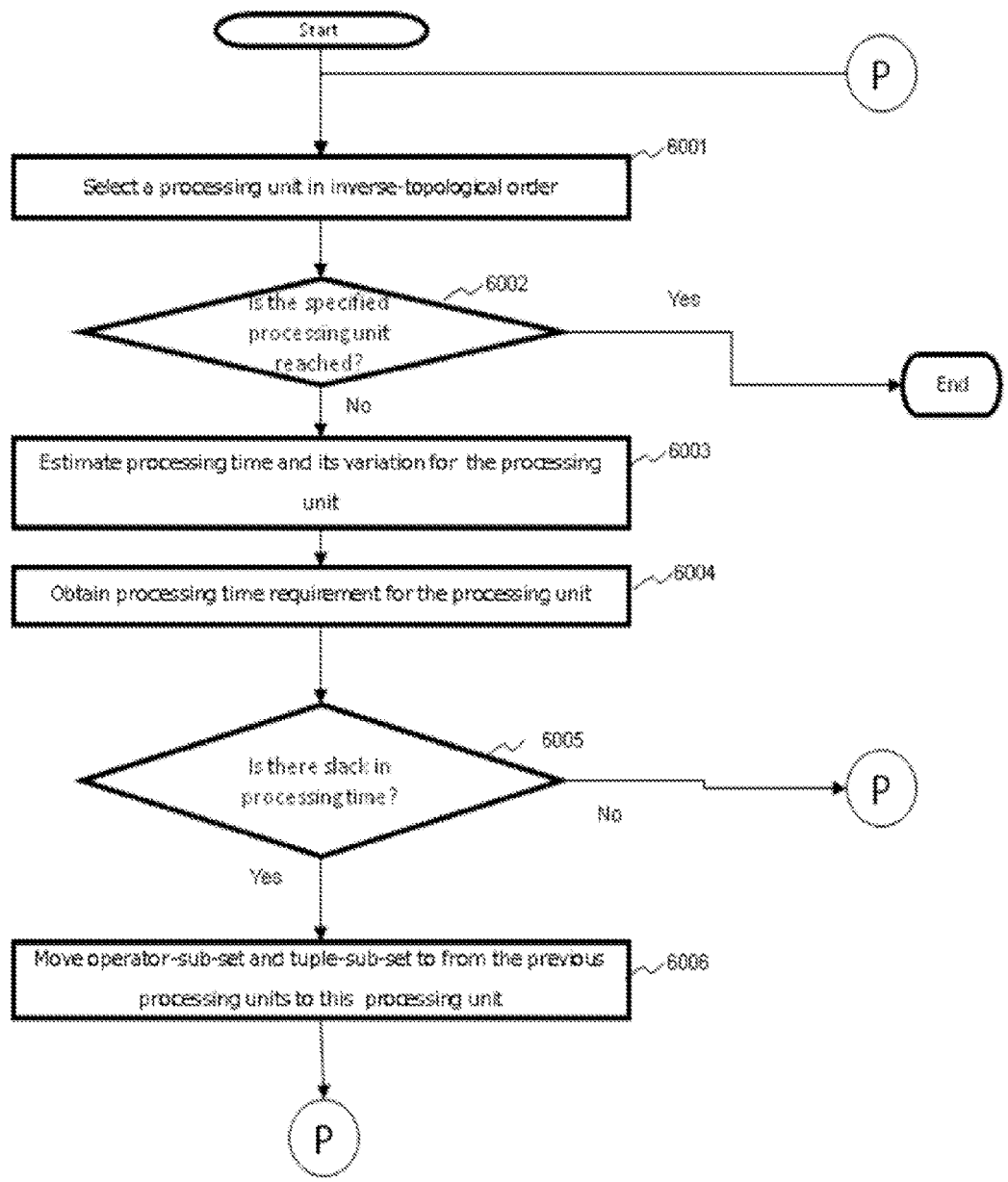
FIG. 6B shows an exemplary process for moving processing time slacks among processing units for estimating operator-set and tuple-set.

FIG. 6B shows an exemplary process for moving processing time slacks among processing units for estimating operator-set and tuple-set. First, a sub-graph of the processing unit graph is chosen as an input. The sub-graph can be the whole processing unit graph following the processing unit specified by the caller or critical-path with regard to processing time following the processing unit specified by the caller. This operation selects a processing unit using the inverse-topological order of the sub-graph (6001).

If the process reaches the specified processing unit, then the process terminates. If not, the process proceeds to 6003 (6002). The process calculates the difference between the original operator and tuple assignment to processing units and the modified one, and the difference is the output.

Next, the process estimates the worst-case processing time of the processing unit by utilizing its processing time variation (6003). The system then obtains the processing time requirement for the processing unit (6004). In 6005, the system checks the processing time. If the estimated processing time is within the processing requirement, the algorithm proceeds to 6006. If not, the algorithm returns to 6001.

The gap between the estimated processing time and the requirement is called slack. Operation 6006 moves the operator-sub-set and tuple-sub-set from the processing units preceding in the sub-graph to fill the sub-set of the slack. The sub-set size can be determined as the required slack amount specified by the caller. The application order restriction of operators is considered when moving the operator-sub-set. For example, if the preceding processing unit has two operators A and B, and there is an order restriction where A and B should be applied in this order, either of the following cases is allowed: (1) only B is moved or (2) both A and B are moved. The examples for movement are following: (1) An average operator is moved from the preceding processing unit to the current processing unit, (2) an average operation for 50% of tuples is moved and (3) a keyword-match operation for the first 100 tuples is moved. After that, the process of FIG. 100 proceeds to 6001.

Figure 7A:
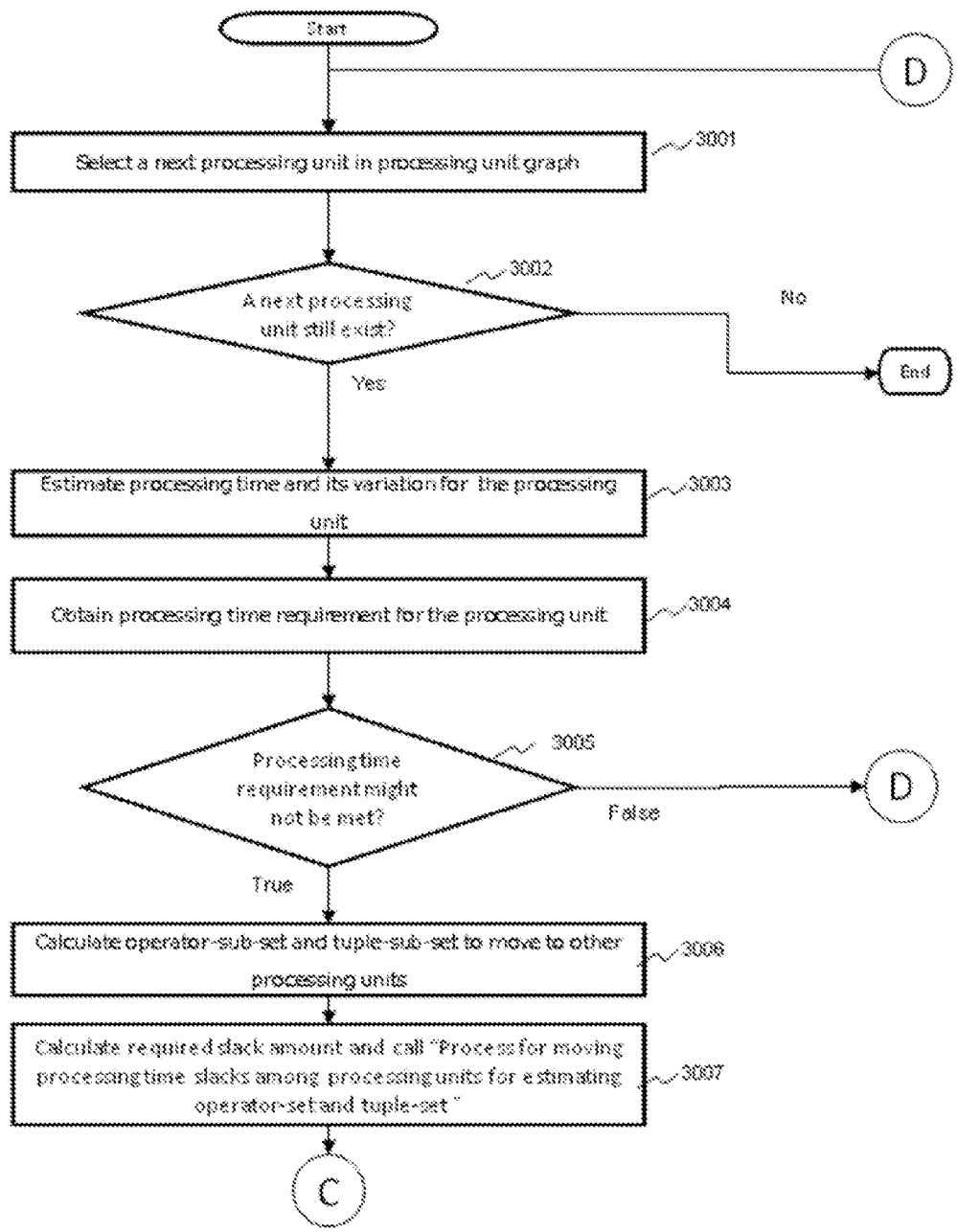
FIGS. 7A and 7B show an exemplary process to select operators to be performed by processing units.
Figure 7B:
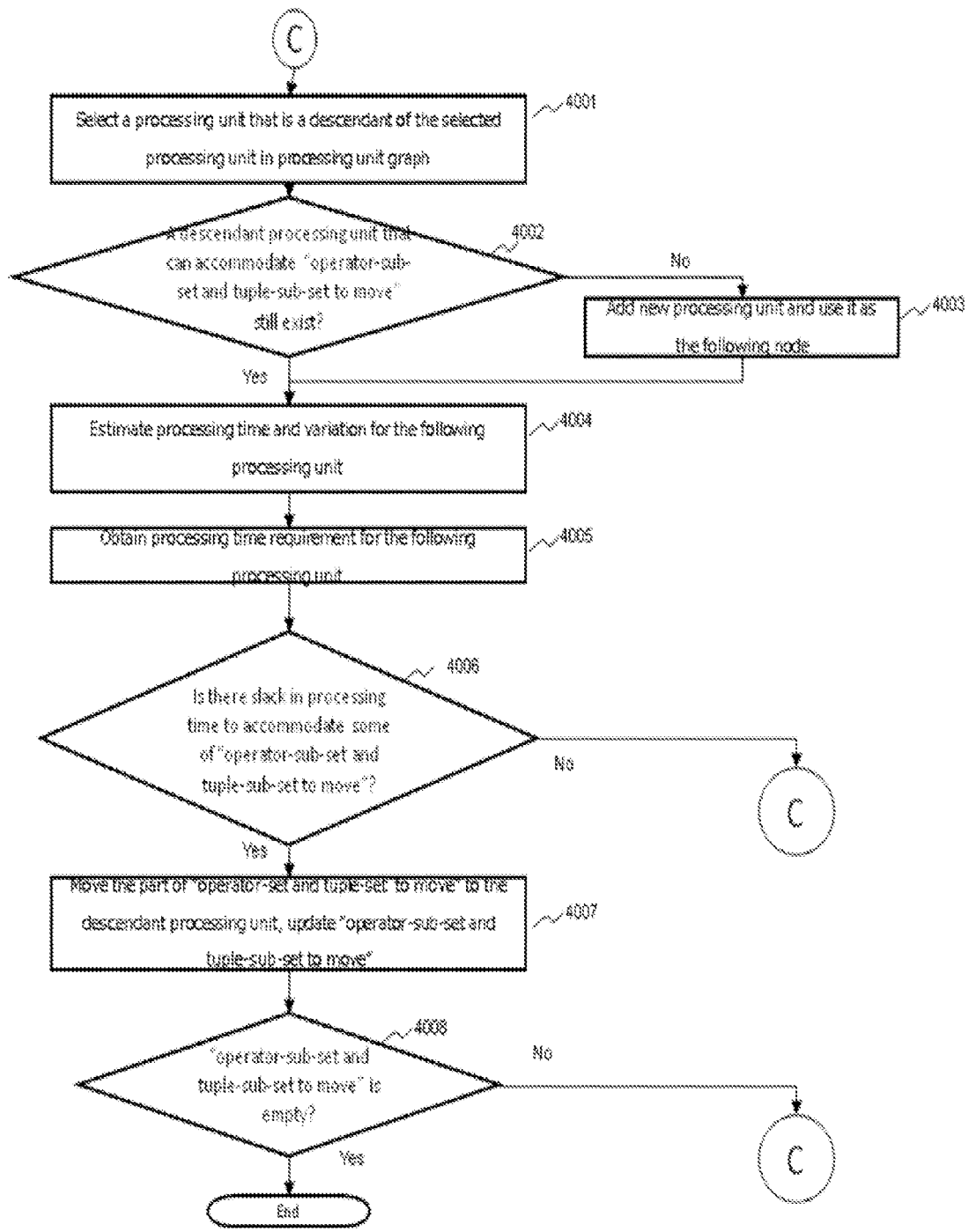

FIGS. 7A and 7B show an exemplary process to estimate operators to be performed by processing units. In 3001, operator assignment to processing units is given by the scheduler. This operation selects a processing unit from processing unit graph in topological order. In 3002, if there is a processing unit that is not selected, the process proceeds to 3003. If not, the process terminates. The modified operator assignment for processing units is the output.

In 3003, the process estimates the worst-case processing time of the processing unit by utilizing its processing time variation. In 3004, the operation obtains processing time requirement for the processing unit. In 3005, if estimated processing time is within the requirement, the process returns to 3001. If not, the process proceeds to 3006 where the process calculates the operator-set and tuple-set to move to processing units following the processing unit so that the processing time requirement will be met.

In 3007, the process calculates the required slack amount by estimating processing time of the operator-sub-set and tuple-sub-set to move performed on a processing unit descendant in the processing unit graph. The process calls "Process for moving processing time slacks among processing units for estimating operator-set and tuple-set" sub-routine with the current processing unit and the required slack amount as the inputs to the sub-routine.

In 4001, the process selects a processing unit that is a descendant of the selected processing unit in the processing unit graph. In 4002, if there is a descendant processing unit that is not selected and if moving "the operator-sub-set and tuple-sub-set to move" on to the descendant processing unit does not violate the operator application order specified by the application, the process proceeds to 4004, otherwise 4003.

Next, in 4003, a new processing unit is created. The unit is inserted into the processing unit graph to make it a descendant of the selected processing unit and uses it as the descendant processing unit in the remainder of the process.

In 4004, the process estimates a worst-case or typical-case processing time of the descendant processing unit by utilizing its processing time variation. In 4005, the process obtains processing time requirement for the descendant processing unit.

In 4006, the gap between the estimated processing time and the requirement is called slack. If the slack exists, the algorithm proceeds to step 4007, otherwise 4001. In 4007, the operation moves a sub-set of "the operator-set and tuple-set to move" to the descendant processing unit, and updates "the operator-set and tuple-set to move".

In 4008, the process determines if "the operator-set and tuple-set to move" gets empty, the process terminates, otherwise the process returns to 2001. When the process terminates, it calculates the difference between the original operator and tuple assignment to processing units and the modified one, and the difference is the output.

Figure 8:
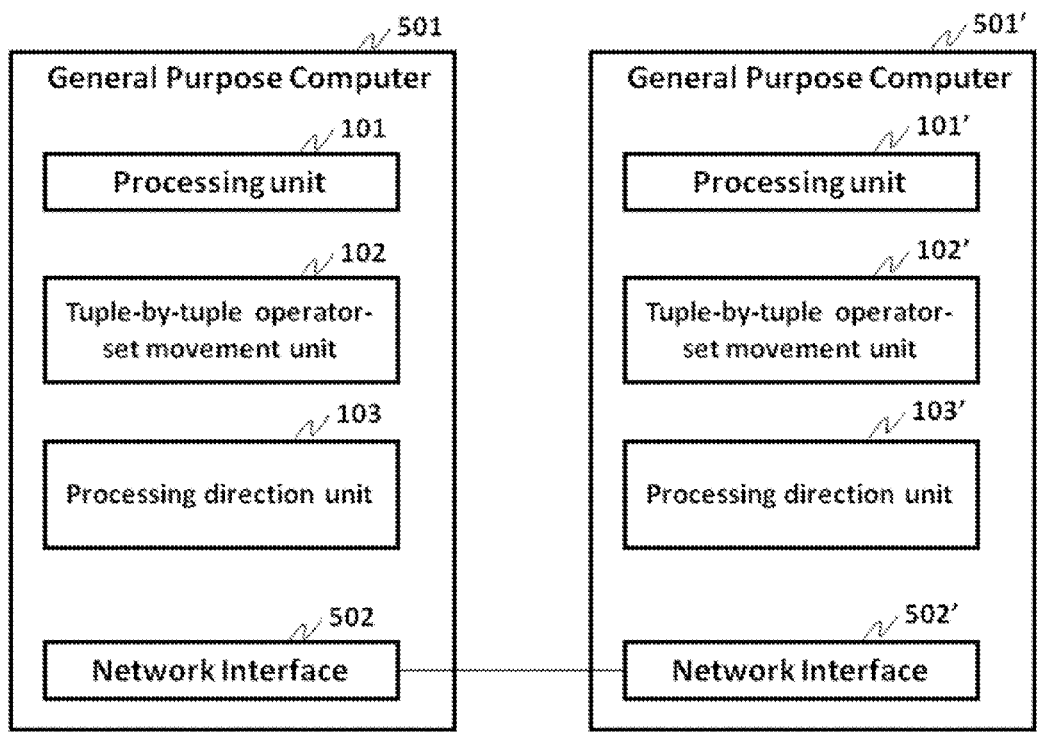
FIG. 8 shows exemplary materialized blocks in accordance with the present invention.

FIG. 8 shows exemplary materialized blocks in accordance with the present invention. Block 501 can be a general purpose computer in one embodiment. Personal computer or servers can implement processing unit 101, tuple-by-tuple operator-set movement unit 102 and processing direction unit 103 by programs running on the general purpose computer or hardware engines running in the general purpose computer. These units communicate through block 502 which is a network interface such as the Ethernet network interface.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

An example of system operation is discussed next. The example has a processing network with two processing units, A and B, and three operators to be performed on tuples, P, Q and R. The initial mapping of operators to processing units is {P, Q} to A, and {R} to B. The tuple-by-tuple operator-set movement unit detects, at run-time, whether or not A can complete the processing of operators initially allocated to it within the specified time budget, for example, 1 ns. Assume the condition changes and it takes 2 ns for A to perform {P, Q}. For this case the tuple-by-tuple operator-set movement unit 102 picks up a subset of operators allocated to A that will be carried-over to and performed on the node B, that follows A in the processing network, so that the processing time of A and B will be within the time budget respectively. If it takes 1 ns for A to perform {Q} and it takes 1 ns for B to perform {P, R}, the tuple-by-tuple operator-set movement unit 102 picks up {P} for the carry-over. The system directs A to skip performing P and directs B to perform P. Then {Q} are performed on A, and {P, R} are performed on B to satisfy the requirement.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A system to process streaming data units (tuples), comprising:
   a. a plurality of processing units to receive tuples for an application, the application having a predetermined processing time requirement, wherein the processing units are connected through a network which applies operators to tuples in a pipe-lined manner, wherein the processing units are organized in a processing unit graph;
   b. a tuple-by-tuple operator set movement unit coupled to the processing units to change an operator-set applied to the tuple by a selected processing unit, on a tuple-by-tuple basis, wherein said tuple-by-tuple operator set movement unit determines whether the processing time for the assigned operators of the selected processing unit exceeds the predetermined processing time requirement and, if said requirement is exceeded, the tuple-by-tuple operator set movement unit selects an operator sub-set and tuple sub-set to be moved to another processing unit;
   wherein a sub-graph of the processing unit graph is chosen as input and descendant processing units in the sub-graph are selected in an inverse-topological order;
   wherein a slack for the selected descendant processing unit is determined by determining the difference between an estimated processing time for the processing unit and a processing time requirement;
   wherein if there is sufficient slack for the selected descendant processing unit at least a portion of the operator sub-set and tuple-sub-set are selected to be moved to the selected descendant processing unit; and
   c. a process direction module for moving operators to processing units according to the selection made by the tuple-by-tuple operator set movement unit.

2. The system of claim 1, wherein the tuple-by-tuple operator-set movement unit inspects and determines a processing unit to perform one or more assigned operators for a particular application within the application's processing time requirement.

3. The system of claim 1, wherein the tuple-by-tuple operator-set movement unit moves a time-gap among processing units by moving operator assignments among processing units.

4. The system of claim 1, wherein the tuple-by-tuple operator-set movement unit determines a processing unit unable to perform assigned operators within the processing time requirement.

5. The system of claim 4, wherein the tuple-by-tuple operator-set movement unit moves operator-sub-set and tuple-sub-set to another processing unit to meet the processing time requirement.

6. The system of claim 1, wherein the tuple-by-tuple operator-set movement unit moves a tuple-subset to decrease a predetermined number of tuples to apply an operator to from a processing unit and increase the predetermined number tuples on another processing unit.

7. The system of claim 1, comprising a time estimator coupled to the tuple-by-tuple operator-set movement unit to estimate processing time for a current node to apply assigned operators.

8. The system of claim 7, wherein the time estimator measures an actual processing time or operates an analytical model comprising current tuple input rate, operator type, and processing unit capability.

9. The system of claim 1, comprising a direction unit coupled to the tuple-by-tuple operator-set movement unit to control a direction of the processing unit.

10. The system of claim 9, wherein the direction unit instructs the processing units on operators to be performed on a tuple through an interconnection network.

11. A system to process streaming data units (tuples), comprising:
   a plurality of processing units to receive tuples for an application, the application having a predetermined processing time requirement, wherein the processing units are connected through a network which applies operators to tuples in a pipe-lined manner, wherein the processing units are organized in a processing unit graph;
   a code estimation and loading unit coupled to the processing units to estimate potential operators and assign operators to the processing units;
   a tuple-by-tuple operator set movement unit coupled to the processing units to change an operator-set applied to the tuple by a selected processing unit, on a tuple-by-tuple basis, wherein said tuple-by-tuple operator set movement unit determines whether the processing time for the assigned operators of the selected processing unit exceeds the predetermined processing time requirement and, if said requirement is exceeded, the tuple-by-tuple operator set movement unit selects an operator sub-set and tuple sub-set to be moved to another processing unit;
wherein a sub-graph of the processing unit graph is chosen as input and descendant processing units in the sub-graph are selected in an inverse-topological order;
wherein a slack for the selected descendant processing unit is determined by determining the difference between an estimated processing time for the processing unit and a processing time requirement;
wherein if there is sufficient slack for the selected descendant processing unit at least a portion of the operator sub-set and tuple-sub-set are selected to be moved to the selected descendant processing unit; and
a process direction module for moving operators to processing units according to the selection made by the tuple-by-tuple operator set movement unit.

12. The system of claim 11, wherein the code estimation and loading unit inspects and determines if a processing unit is unable to perform assigned operator application within the processing time requirement.

13. The system of claim 12, wherein the code estimation and loading unit simulates moving an operator-set and a tuple-set to another processing unit to meet the processing time requirement and to estimate potential operators to be moved to the processing units.

14. The system of claim 11, wherein the code estimation and loading unit estimates a worst-case or typical-case processing time of the processing unit by utilizing processing time variation.

15. The system of claim 11, comprising a timing module coupled to the code estimation and loading unit to store processing time requirement for each processing unit.

16. The system of claim 11, comprising a code loading direction unit coupled to the code estimation and loading unit to direct codes to be loaded on the processing units.

17. A system to process streaming data units (tuples), comprising:
 a. a plurality of processing units to receive tuples for an application, the application having a predetermined processing time requirement, wherein the processing units are connected through a network which applies operators to tuples in a pipe-lined manner, wherein the processing units are organized in a processing unit graph;
 b. a tuple-by-tuple operator set movement unit coupled to the processing units to change an operator-set applied to the tuple by a selected processing unit, on a tuple-by-tuple basis, wherein said tuple-by-tuple operator set movement unit determines whether the processing time for the assigned operators of the selected processing unit exceeds the predetermined processing time requirement and, if said requirement is exceeded, the tuple-by-tuple operator set movement unit selects an operator sub-set and tuple sub-set to be moved to another processing unit;
  wherein a sub-graph of the processing unit graph is chosen as input and descendant processing units in the sub-graph are selected in an inverse-topological order;
  wherein a slack for the selected descendant processing unit is determined by determining the difference between an estimated processing time for the processing unit and a processing time requirement;
  wherein if there is sufficient slack for the selected descendant processing unit at least a portion of the operator sub-set and tuple-sub-set are selected to be moved to the selected descendant processing unit; and
 c. a code estimation and loading unit coupled to the processing units to estimate potential operators and assign operators to the processing units;
 d. a process direction module for moving operators to processing units according to the selection made by the tuple-by-tuple operator set movement unit.

18. A method to process streaming data units (tuples) for an application, using a plurality of processing units, the application have a predetermined processing time requirement comprising:
 a. changing an operator-set applied to the tuple by a selected processing unit, on a tuple-by-tuple basis;
  wherein the application utilizes a plurality of processing units, the application having a predetermined processing time requirement,
  wherein the processing units are connected through a network which applies operators to tuples in a pipe-lined manner,
  wherein the processing units are organized in a processing unit graph;
  wherein a tuple-by-tuple operator set movement unit determines whether the processing time for the assigned operators of the selected processing unit exceeds the predetermined processing time requirement and, if said requirement is exceeded, the tuple-by-tuple operator set movement unit selects an operator sub-set and tuple sub-set to be moved to another processing unit;
  wherein a sub-graph of the processing unit graph is chosen as input and descendant processing units in the sub-graph are selected in an inverse-topological order;
  wherein a slack for the selected descendant processing unit is determined by determining the difference between an estimated processing time for the processing unit and a processing time requirement;
  wherein if there is sufficient slack for the selected descendant processing unit at least a portion of the operator sub-set and tuple-sub-set are selected to be moved to the selected descendant processing unit;
 b. estimating code requirement for potential operators based on processing unit capability; and
 c. assigning the potential operators to the processing units using a process direction module for moving operators to processing units according to the selection made by the tuple-by-tuple operator set movement unit.

19. The method of claim 18, comprising selecting a processing unit unable to perform an assigned operator application within the predetermined processing time requirement and moving the operator-set and tuple-set to other processing units to meet the processing time requirement.

20. The method of claim 18, comprising inspecting and selecting a processing unit to perform one or more assigned operators for a particular application within the application's processing time requirement.

* * * * *